(12) United States Patent
Lee

(10) Patent No.: US 11,458,498 B2
(45) Date of Patent: Oct. 4, 2022

(54) PAINTING BOOTH BEING POSSIBLE TO REUTILIZE BY WITHDRAWING OF SPRAYED PAINT

(71) Applicant: Myoung Jong Lee, Seoul (KR)

(72) Inventor: Myoung Jong Lee, Seoul (KR)

( * ) Notice: Subject to any disclaimer, the term of this patent is extended or adjusted under 35 U.S.C. 154(b) by 0 days.

(21) Appl. No.: 17/324,213

(22) Filed: May 19, 2021

(65) Prior Publication Data
US 2022/0023905 A1    Jan. 27, 2022

(30) Foreign Application Priority Data

Jul. 23, 2020 (KR) .................. 10-2020-0091728

(51) Int. Cl.
| | | |
|---|---|---|
| *B05B 14/43* | (2018.01) | |
| *B05B 14/41* | (2018.01) | |
| *B01D 46/10* | (2006.01) | |
| *B01D 46/18* | (2006.01) | |
| *B05B 14/44* | (2018.01) | |
| *B01D 46/681* | (2022.01) | |
| *B05B 14/20* | (2018.01) | |
| *B05B 16/40* | (2018.01) | |
| *B08B 1/02* | (2006.01) | |
| *B08B 1/00* | (2006.01) | |

(52) U.S. Cl.
CPC .............. *B05B 14/43* (2018.02); *B01D 46/10* (2013.01); *B01D 46/18* (2013.01); *B01D 46/681* (2022.01); *B05B 14/20* (2018.02); *B05B 14/41* (2018.02); *B05B 14/412* (2018.02); *B05B 14/44* (2018.02); *B05B 16/40* (2018.02); *B08B 1/005* (2013.01); *B08B 1/02* (2013.01); *Y10S 55/46* (2013.01)

(58) Field of Classification Search
None
See application file for complete search history.

(56) References Cited

U.S. PATENT DOCUMENTS

| | | | | |
|---|---|---|---|---|
| 3,252,401 A | * | 5/1966 | Smith ................. | B05B 14/43 118/326 |
| 3,899,311 A | * | 8/1975 | Rapp .................. | B05B 14/43 118/634 |
| 4,153,008 A | * | 5/1979 | Marino ............... | B05B 14/20 118/634 |
| 4,354,451 A | * | 10/1982 | Vohringer .......... | B05B 14/48 118/628 |
| 4,506,625 A | * | 3/1985 | Vohringer .......... | B05B 14/43 118/312 |
| 4,530,274 A | * | 7/1985 | Lyons ................ | B05B 14/43 55/DIG. 46 |
| 4,955,990 A | * | 9/1990 | Napadow ........... | B05B 14/44 55/DIG. 46 |
| 2012/0308732 A1 | * | 12/2012 | Chiang .............. | B05B 14/43 118/602 |

* cited by examiner

*Primary Examiner* — Binu Thomas
(74) *Attorney, Agent, or Firm* — Sughrue Mion, PLLC

(57) ABSTRACT

The present invention relates to a painting booth having a structure which sprays a paint in a painting booth, and is capable of reutilizing by withdrawing a used paint, and preventing atmospheric pollution and surrounding contamination, and is configured to include: an exhaust duct installed in an upper part of a booth; a filter plate configured by a metal net, which is installed on a front wall of the booth; a bottom filter plate installed on a bottom of the booth, and a collector collecting paint sludge which falls to the bottom.

4 Claims, 6 Drawing Sheets

[FIG. 1]
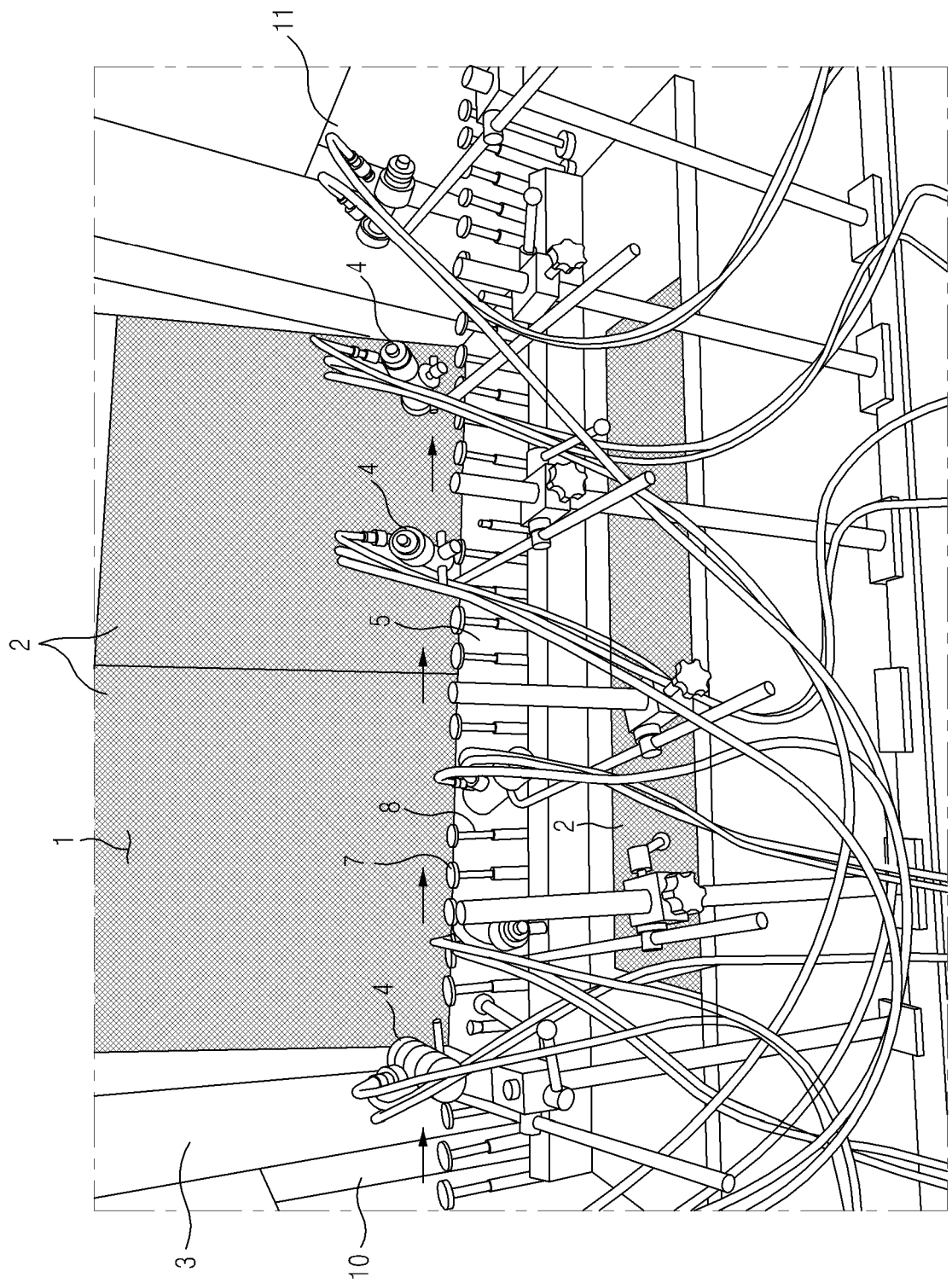

[FIG. 2]
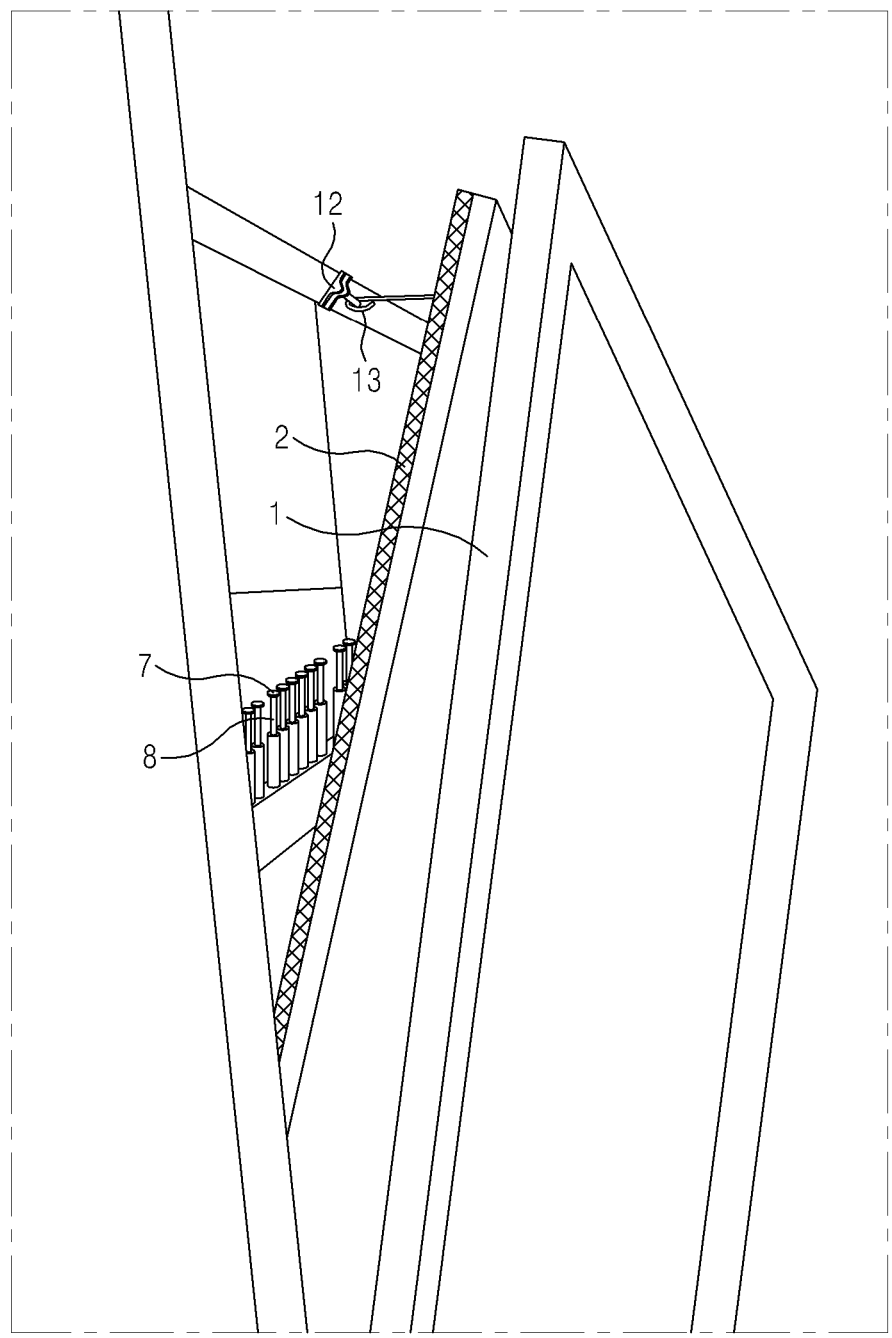

[FIG. 3]
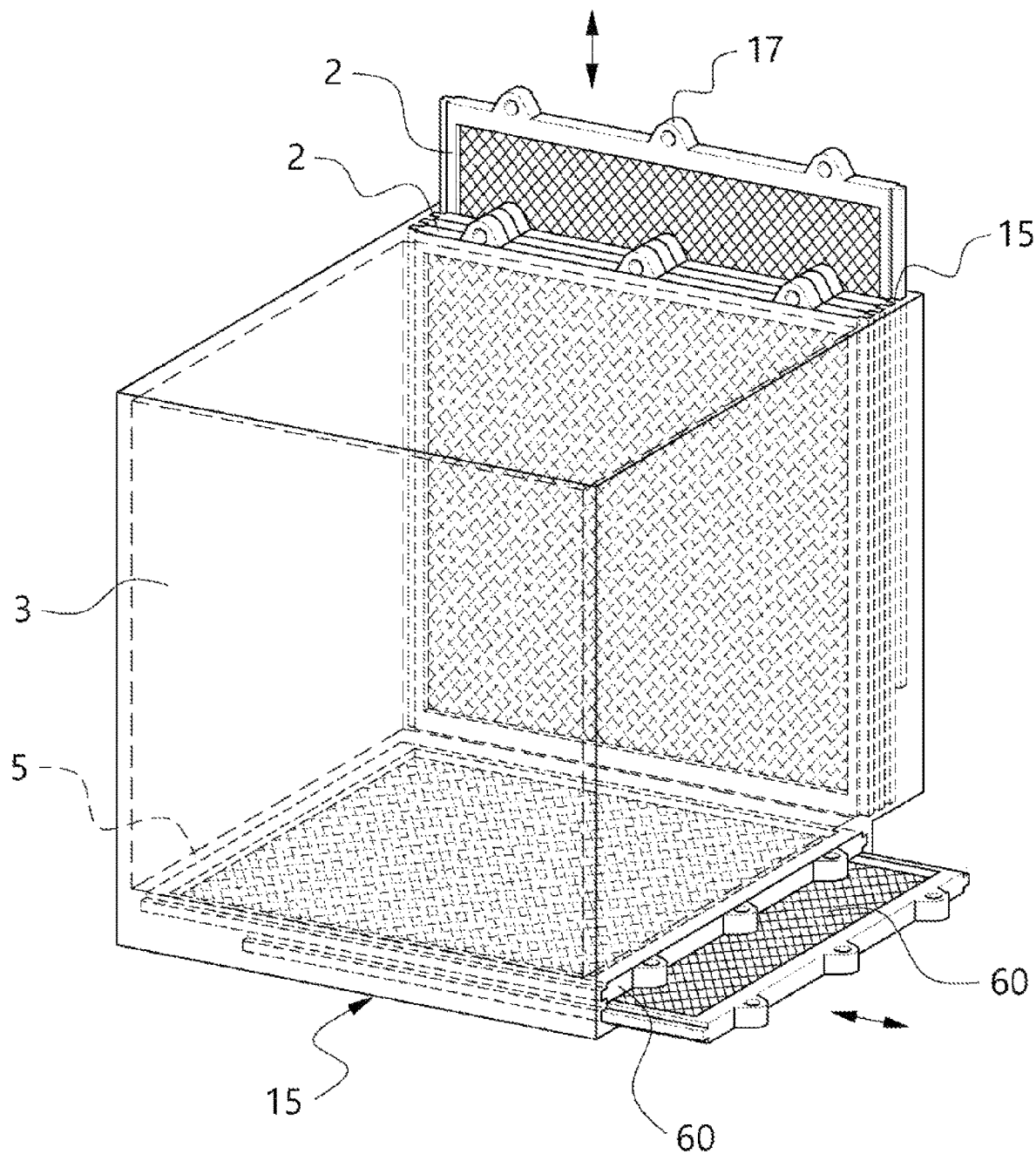

[FIG. 4A]
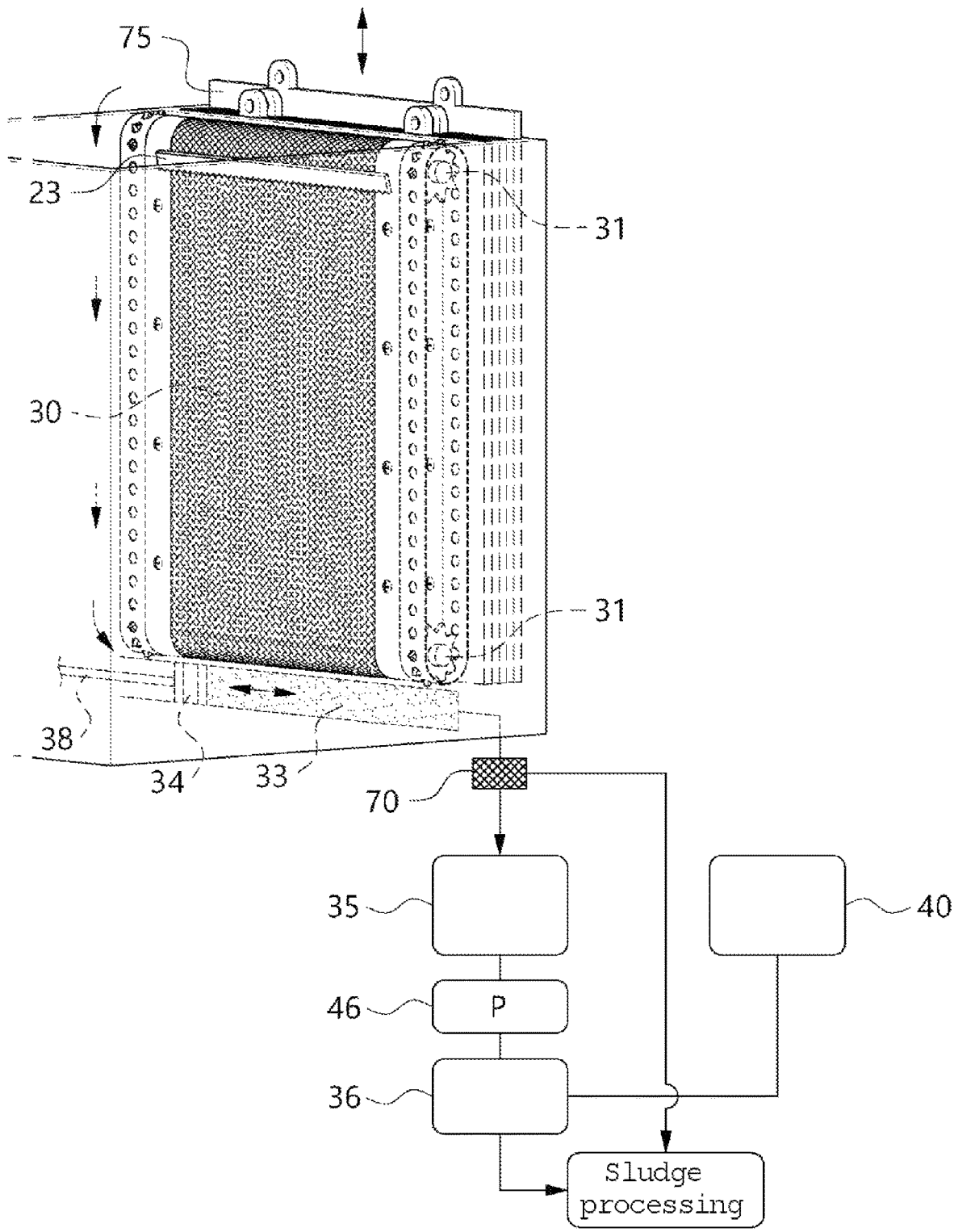

[FIG. 4B]
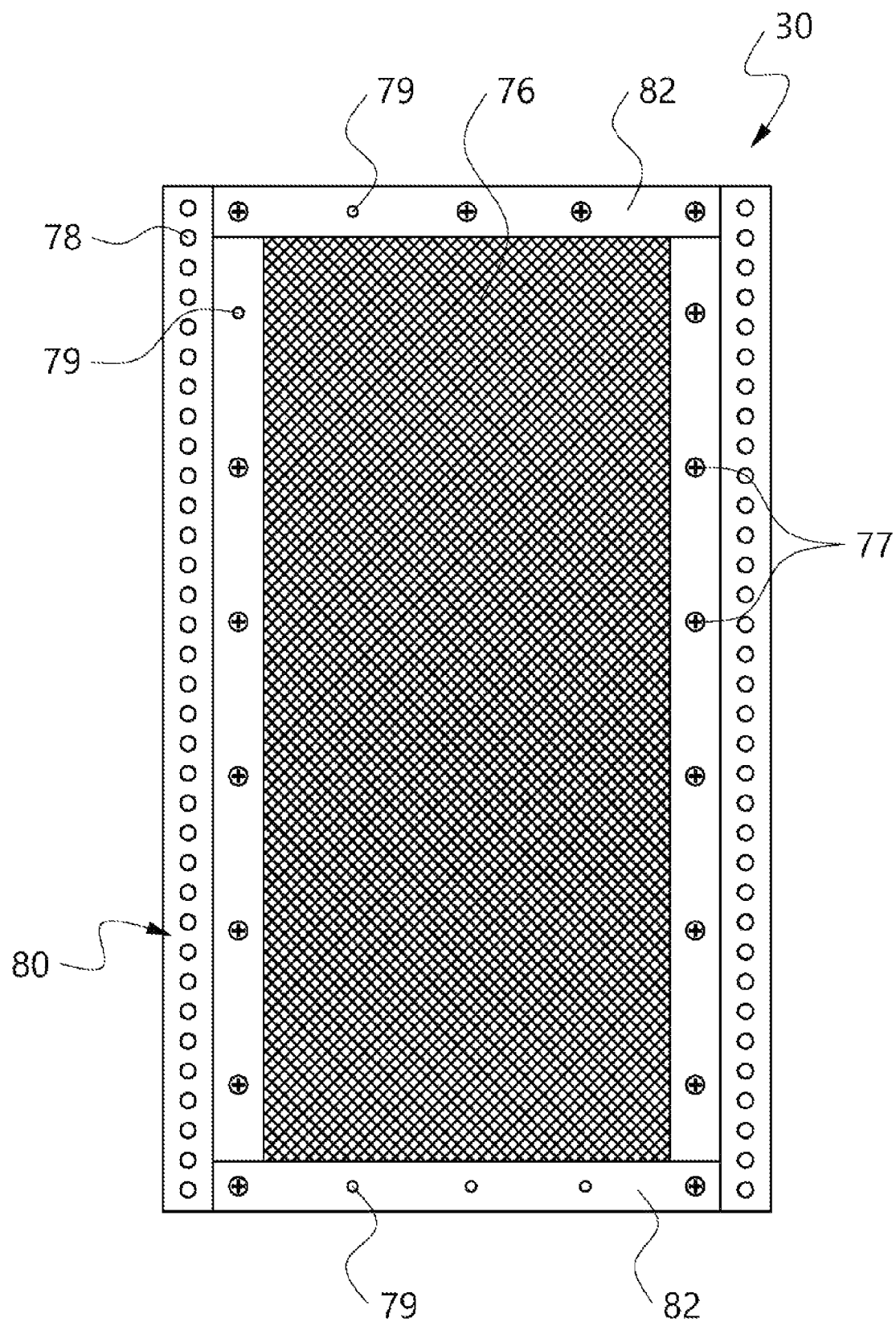

[FIG. 5]
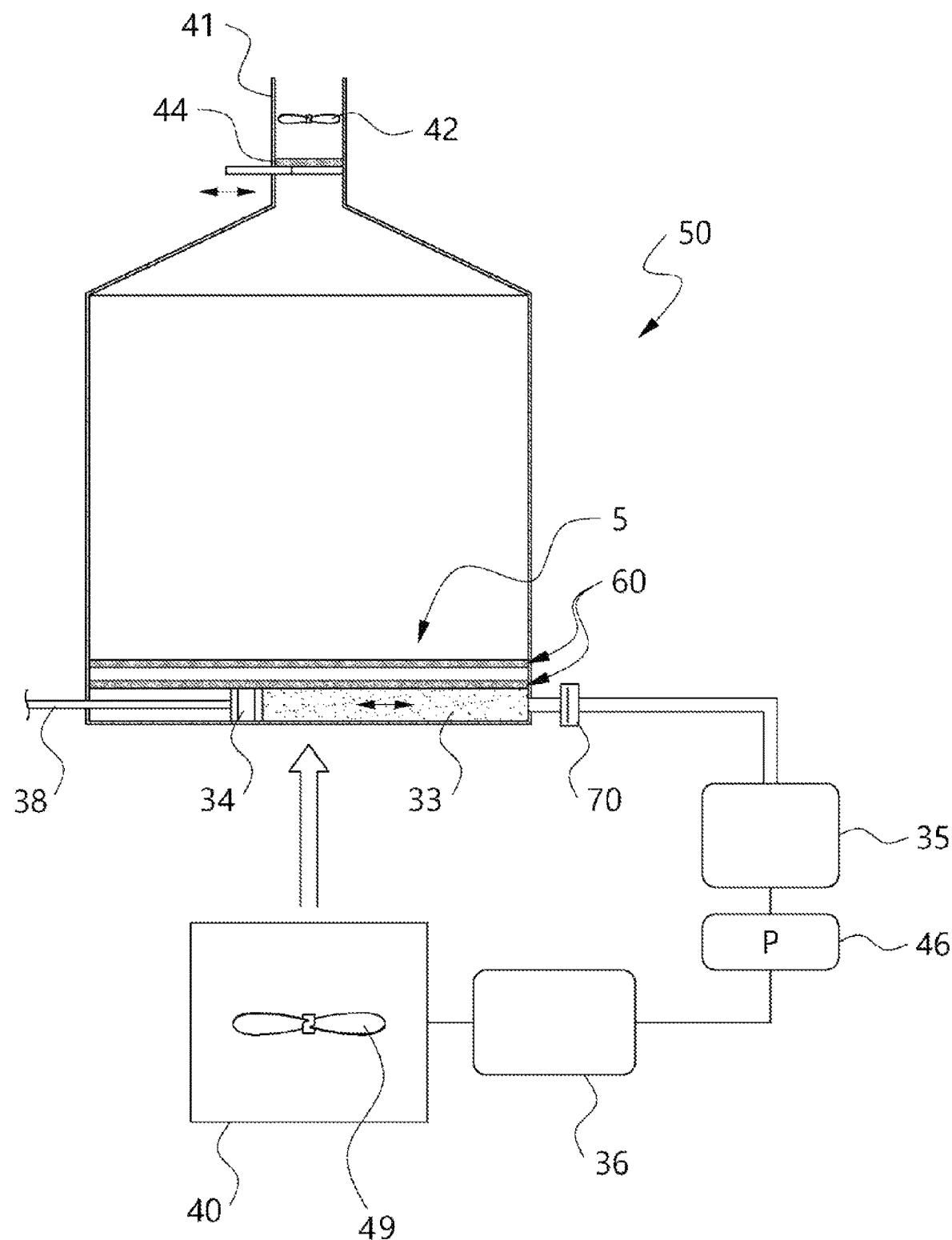

PAINTING BOOTH BEING POSSIBLE TO REUTILIZE BY WITHDRAWING OF SPRAYED PAINT

CROSS-REFERENCE TO RELATED APPLICATIONS

This application claims the priority of Korean Patent Application No. 10-2020-0091728 filed on Jul. 23, 2020, in the Korean Intellectual Property Office, the disclosure of which is incorporated herein by reference.

BACKGROUND OF THE INVENTION

Field of the Invention

The present invention relates to a painting booth having a structure which can withdraw a paint by spraying the paint in a painting booth for painting coating on a product surface, in particular, a small article, for example, a lid of a cosmetic container, and reutilize the withdrawn paint prevent air pollution and surrounding contamination.

Description of the Related Art

In a painting booth, when spray painting on an outer surface of a predetermined article, for example, in a process of spraying a painting paint on the outer surface of a product such as a lid of a container, a conventional painting booth is installed on the bottom of the booth and painting is performed while spraying water on the top. In this case, surrounding external and air pollution should be prevented by particularly spraying the water from the top in order to prevent the sprayed paint from being scattered.

In this case, the water and a sprayed dust state paint are mixed to fall to the bottom, resulting in a sludge, which causes a malfunction of a circulation pump, etc. Further, in the case of the sludge of the mixture of the paint and the water, it is difficult to treat contaminated water, large processing cost is generated, and the sludge is intractable. In addition, the water-paint mixture sludge is sticky and thus hardened in a form like rice cake, and as a result, it is difficult to treat the sludge, resulting in suffering a difficulty in maintenance of a facility and taking a lot of time for the maintenance and causing facility maintenance cost to increase.

Further, in the conventional case, as a sprayed paint material is attached to an inner wall of the booth, it is very difficult to clean the sprayed paint material and an operation of the facility should be stopped, so there is a problem that productivity is lowered.

SUMMARY OF THE INVENTION

The present invention is contrived to solve the conventional problems, and an object of the present invention is to reduce paint material cost and does not need a used water supply device by withdrawing and reutilizing a paint discarded without using water, and reduce facility cost, and operation maintenance cost due to not using the water.

Further, an object of the present invention is to provide a painting booth having a structure which can remove a cause of a malfunction which occurs in throughout a painting facility due to a sludge generated by a mixture of water and a sprayed dust state paint, and resolve a contamination water treatment problem due to a painting dust and water mixture and reduce contamination water treatment facility cost and contamination water treatment cost, and resolve a problem of environmental contamination.

In respect to main components of the present invention to solve the problem, a painting booth being capable of reutilizing by withdrawing a sprayed paint in a painting booth which sprays a paint to a product surface to be painted and coating the product surface with the paint includes: an exhaust duct 41 having an exhaust fan 42 installed in an upper part of a booth; a filter plate 2 configured by a metal net installed on a front wall 1 of the booth; a bottom filter plate 60 installed on a bottom 5 of the booth; a collector 35 collecting paint sludge which falls on the bottom; a circulation pump pumping the paint sludge from the collector 35; and a paint tank 40 sent to reutilize the paint by the circulation pump 46, and the filter plate 2 is further installed on left and right walls of the booth, and one to ten filter plates 2 and bottom filter plates 60 are installed to overlap with each other, the filter plate 2 and the bottom filter plate 60 are installed in a storage frame 15 in a drawer scheme and configured in a structure capable of being drawn and inserted, and a cover 75 is installed in a rearmost side of the filter plate 2, a rotating filter plate 30 is installed in front of the front wall 1 of the booth, which is capable of being circulated in a conveyer scheme in a vertical direction and sprockets 31 are installed on both vertical and horizontal ends of the rotating filter plate 30 to be configured to be circularly rotated, and a scraper 23 is installed in the rotating filter plate 30 to be configured to scrape paint sludge attached to the surface of the rotating filter plate 30.

Further, the rotating filter plate 30 is constituted by a net 76, fixation strips 80 assembled to both side ends of the net 76 and having through-holes 78 capable of being coupled with the sprockets 31, and a coupling plate 82 assembled to upper and lower sides of the net 76 to be assembled and installed in the sprocket 31, a piston 34 having a push rod 38 on a front end is installed in any one of the filter plate 2 and the rotating filter plate 30 to be configured to collect paint sludge which falls to the bottom in the side part and collect the paint sludge in the collector 35, and an exhaust filter 44 is installed in an exhaust duct 41, a filter 70 is installed between the bottom 5 and the collector 35, and a second filter 50 is installed between the circulation pump 46 and the paint tank 40.

According to the present invention, paint material cost is reduced and a used water supply device is not required by withdrawing and reutilizing a paint discarded without using water to reduce facility cost, and operation maintenance cost due to not using the water.

Further, according to the present invention, it is possible to remove a cause of a malfunction which occurs in throughout a painting facility due to a sludge generated by a mixture of water and a sprayed dust state paint, and resolve a contamination water treatment problem due to a painting dust and water mixture and reduce contamination water treatment facility cost and contamination water treatment cost, and resolve a problem of environmental contamination.

Further, according to the present invention, maintenance of the painting facility is simple and maintenance cost is small, and contaminants generated after painting are significantly reduced and an environmental facility is possible.

Further, in the present invention, a filter plate 2 itself is modularized into one assembly so as to be replaced with another clean filter plate by lifting and removing the filter plate 2 from the top to rapidly perform a replacement operation of the filter plate 2, thereby enhancing productivity.

Further, according to the present invention, a dust collecting facility becomes smaller to be installed in a narrow space and initial investment cost is also small.

Further, fine dust can be reduced further than the related art, thereby reducing odor in a workplace. The reason is that a filter plate having a metal net structure approaches and collects contaminants generated after spray painting, and discharge the contaminants to the outside of the workplace.

BRIEF DESCRIPTION OF THE DRAWINGS

The above and other aspects, features and other advantages of the present invention will be more clearly understood from the following detailed description taken in conjunction with the accompanying drawings, in which:

FIG. 1 illustrates an exemplary embodiment of a painting booth according to the present invention;

FIG. 2 is a diagram illustrating a state in which a front wall 1 portion of the painting booth is bent back and opened;

FIG. 3 is an installation configuration diagram of a filter plate in the painting booth according to the present invention;

FIG. 4A illustrates another exemplary embodiment of FIG. 3;

FIG. 4B is a diagram for describing a configuration example for a rotating filter plate 30; and FIG. 5 is a diagram illustrating a withdrawal circulation apparatus of sludge and an exhaust.

DETAILED DESCRIPTION OF THE PREFERRED EMBODIMENT

Hereinafter, the present invention will be additionally described together with the accompanying drawings.

FIG. 1 is a diagram illustrating an inner part of a painting booth according to the present invention.

As illustrated in FIG. 1, a metal net filter plate 2 is installed on the front wall 1. It is preferable that only one filter plate 2 is not installed, but several filter plates 2 are installed. A reason for using the metal net filter without installing a simple flat plate is that if a point mist sprayed by a nozzle hits the flat plate, a spray liquid is re-reflected and attached to a surface of a product to be applied, resulting in a product defect. When an iron net is used, the paint mist reflected by spraying is not generated, but the paint mist is attached or attached to an iron net located in the rear by passing through holes of the iron net. The filter plate 2 may also be installed on left and right side walls 3 in a booth. In addition, the filter plate 2 is also installed on a bottom 5. In particular, the metal filter plate 2 is also installed below the paint spray nozzle 4.

For reference, an operation of applying the paint to caps of various containers of cosmetics, etc., is described below with reference to FIG. 1.

A cap 7 is installed on the top of a rotation shaft 8, and enters a left inlet 10 along a rail while rotating and moves a right outlet 11 of the painting booth. In this case, two paint spray nozzles 4 installed at the left side spray the paint horizontally and three nozzles 4 at the right side sprays the paint from the top to the bottom a little slantly. Then, the paint is evenly sprayed to the surface of the rotating cap 7.

In this case, the sprayed painted paint is scattered in a fine dust form and the most scattered paint is attached to the front wall 1 by a spray pressure of the nozzle. In addition, scattered dust type paint is scattered and attached to the top, and the left and right side walls, and when the time elapses, the paint attached to the walls flows down and falls to the bottom.

Therefore, in the present invention, a largest number of filter plates 2 are installed in multiple layers on the front wall 1 and at least one metal net filter plate 2 is also installed on the side wall and the bottom 5.

There are various sprayed paints. For example, since a UV paint is high in fluidity, the UV paint flows down, but is temporally solidified. Urethane and acrylic paints, for example, urethane and acrylic paints (2 liquid type paint) are dried, the urethane and acrylic paints easily become a power type. That is, since the urethane and acrylic paints are low in fluidity, the urethane and acrylic paints do not flow down and are thus adhered and attached to the wall surface.

FIG. 2 is a diagram illustrating the front wall 1 from the rear.

As illustrated, the front wall 1 has a hinge (not illustrated) on the bottom and is configured to be opened in an opening/closing type. A ring 13 is connected to the top of the front wall 1 and hung on a latch 12 to configured to perform a replacement operation of the filter plate 2.

A separated filter plate 2 is washed with being immersed in thinner or washed being sprayed with the thinner. A paint solidified temporally long in or attached in a sludge form to the filter plate 2 is easily washed when caustic soda is boiled, and the filter plate 2 is immersed in the caustic soda and washed.

FIG. 3 is another exemplary embodiment of the prior art.

As illustrated, in the exemplary embodiment, the filter plate 2 is installed in several sheets, preferably, up to 10 sheets in a storage drawer scheme. That is, the filter plate 2 itself is modularized into one assembly so that the filter plate 2 is lifted from the top and removed on the top of the front wall and replaced with another clean filter plate 2. In addition, when a separated storage frame 15 for storing the filter plate 2 is installed and inserted into the storage frame 15, the filter plate 2 is easily replaced. Therefore, a replacement operation time of the filter plate 2 is shortened to increase productivity.

Since a frontmost filter plate 2 has the highest contamination degree, the filter plate 2 is frequently replaced and since a filter plate 2 which is installed farther back from the front is less contaminated, a replacement cycle is long. Therefore, when only the frontmost filter plate 2 and one to three subsequent sheets are frequently replaced, a filter plate 2 which is installed in the rear thereof may be used for a long time, and as a result, replacement of the filter plate is efficiently performed and work efficiency is also enhanced. A hook portion 17 is formed on the top of the filter plate 2 so as to easily withdraw the filter plate 2 from the storage frame 15.

The filter plate 2 of such a configuration may also be configured on the left and right side walls 3. Since a lot of paint dust is not attached to the side wall 3, even though only approximately 3 filters 2 are installed, it is sufficient. Similarly to the filter plate 2 configured on the front wall 1, the storage frame 15 is installed, and the filter plate 2 is configured to be inserted into and removed from the storage frame 15. The filter plate 2 configured on the side wall 3 may be configured in any scheme like withdrawal from the top or the side.

A bottom filter plate 60 is also installed in the bottom 5, and approximately one to three sheets are also installed in the bottom and is installable in a storage type of a structure to withdraw the bottom filter plate to the side or in front and forth in a drawer scheme.

FIG. 4A illustrates another configuration example of the filter plate 2 illustrated in FIG. 3 (that is, illustrated on the front wall).

Since the filter plate 2 configured on the front wall has a high contamination degree and should be most frequently cleaned, the filter plate 2 is configured to be automatically cleaned. That is, a scraper 23 is installed on the top, and a rotating filter plate 30 is configured in such a manner that the filter plate rotates while contacting the scraper 23. The rotating filter plate 30 has sprockets 31 on both ends of left and right, and upper and lower sides for the rotation. The rotation of the rotating filter plate 30 may be configured to be continuously slowly performed or operated at a predetermined time interval. Meanwhile, when the interval is too long, the paint is solidified, so a reutilizing degree of the withdrawn paint is undesirably lower.

The rotation of the sprocket 31 may be configured to move forward and backward according to actuation of a motor or configured to rotate only in one direction. That is, the rotating filter plate 30 may be operated to move down from the top to the bottom or operated move up from the bottom to the top according to a forward/reverse direction of a motor (not illustrated). Several filter plates 2 of the above exemplary embodiment are installed in the rear of the rotating filter plate 30 and a cover 75 is selectively installed in a rearmost portion. Very small amount of paint dust is applied to the rearmost filter plate 2, and finally, not the filter but a cover 75 formed by a flat plate is installed in the rearmost portion to completely prevent the paint dust from being discharged to the outside of a booth box.

FIG. 4B illustrates a specific configuration example for the rotating filter plate 30.

A generally commercially available metal net 76 is prepared and a fixation strip 80 capable of fixing the metal net 76 is prepared. The fixation strip 80 has through-holes 78 which may engage with teeth of the sprocket 31 (illustrated in FIG. 4A) at an outermost side and holes which may fasten a coupling instrument 77 such as a screw, etc., inside the through-holes 78. Two fixation strips 80 overlap with ach other and the net 6 is inserted between two fixation strips 80 and are fastened by the screw, etc., through the coupling instrument 77. Both the left and right side are fastened. In addition, coupling plates 82 capable of both upper and lower ends are patched and assembled to both upper and lower ends of the net 76. When the coupling plates 82 assembled to both upper and lower ends of the net by suspending the prepared assembly to the sprocket 31 are patched to each other and coupled through fastening holes 79, mounting of the rotating filter plate 30 is completed.

Referring back to FIG. 4A, a piston 34 and a push rod 38 for discharging a liquid paint and a sludge 33 which fall by the scraper 23 are installed on the bottom and the liquid paint and the sludge 33 pushed and discharged to one side by the piston 34 are collected to a collector 35 via a filter 70 and separately processed. In the collector 35, a liquid waste paint is withdrawn to a paint tank 40 via a circulation pump 46 and a second filter 36 and is circulated and reutilized in a booth in which a paint spray nozzle is installed, and a rice cake type sludge 33 filtered by a filter 36 is waste-processed. Through such a configuration, there is an advantage in that it is more convenient to clean the filter plate and the filter plate may be operated for a long time without cleaning and replacing the filter plate.

FIG. 5 is a diagram for describing an exhaust of a paint applying booth 50 and a paint circulating system in a lower portion. As illustrated, an exhaust duct 41 for exhaust is installed on the top of the booth 50 and inhalation by an exhaust fan 42 is made, and as a result, the paint dust is exhausted. In this case, an exhaust filter 44 is installed on the bottom of the exhaust duct 41 and dust particles are caught at any degree to prevent a worksite surrounding environment and atmospheric pollution. The exhaust filter 44 is also configured in the drawer scheme which may be inserted and withdrawn on the side to facilitate filter replacement.

Multiple layers of filter plates 2 are installed on the bottom 5 in a lower part of the booth 40 and the paint and sludge 33 which flow down are gathered below the filter plates 2. The paint and the sludge 33 are pushed to the side part by the piston 34 and pass through the filter 70 and the collector 35, and pass through the second filter 36 again and are withdrawn to the paint tank 40 by actuation of the circulation pump 46. An agitation fan 49 is installed in the paint tank 40, which well mixes the paint and the sludge 33 with the withdrawn paint and further prevents the paint from being solidified.

By such a configuration, as the water is not used, paint wastewater is not generated and the paint is enabled to be circulated and reused, a work environment becomes very clean, and the atmospheric pollution by the paint dust exhausted to the atmosphere is also prevented.

What is claimed is:

1. A painting booth being capable of reutilizing by withdrawing a sprayed paint in the painting booth which sprays a paint to a product surface to be painted and coating the product surface with the paint, the painting booth comprising:

an exhaust duct (41) having an exhaust fan (42) installed in an upper part of the painting booth;
a filter plate (2) configured by a metal net installed on a front wall (1) of the painting booth;
a bottom filter plate (60) installed on a bottom (5) of the painting booth;
a collector (35) collecting paint sludge which falls on the bottom (5);
a circulation pump (46) pumping the paint sludge from the collector (35); and
a paint tank (40) sent to reutilize the paint by the circulation pump (46),
wherein the filter plate (2) and the bottom filter plate (60) are installed in a storage frame (15) in a drawer scheme and configured in a structure capable of being drawn and inserted, and a cover (75) is installed in a rearmost side of the filter plate (2).

2. A painting booth being capable of reutilizing by withdrawing a sprayed paint in the painting booth which sprays a paint to a product surface to be painted and coating the product surface with the paint, the painting booth comprising:

an exhaust duct (41) having an exhaust fan (42) installed in an upper part of the painting booth;
a filter plate (2) configured by a metal net installed on a front wall (1) of the painting booth;
a bottom filter plate (60) installed on a bottom (5) of the painting booth;
a collector (35) collecting paint sludge which falls on the bottom (5);
a circulation pump (46) pumping the paint sludge from the collector (35); and
a paint tank (40) sent to reutilize the paint by the circulation pump (46),
wherein a rotating filter plate (30) is installed in front of the front wall (1) of the painting booth, which is capable of being circulated in a conveyer scheme in a vertical direction and sprockets (31) are installed on both vertical and horizontal ends of the rotating filter plate (30) to be configured to be circularly rotated, a scraper (23) is installed in the rotating filter plate (30) to be configured to scrape paint sludge attached to a surface of the rotating filter plate (30), and the rotating filter plate (30) is constituted by a net (76), fixation strips (80) assembled to both side ends of the net (76) and having through-holes (78) capable of being coupled with the sprockets (31), and coupling plates (82) assembled to upper and lower sides of the net (76) to be assembled and installed in the sprockets (31).

3. The painting booth being capable of reutilizing by withdrawing a sprayed paint of claim 2, wherein a piston (34) having a push rod (38) on a front end is installed in the rotating filter plate (30) to be configured to collect paint sludge which falls to the bottom (5) and collect the paint sludge in the collector (35).

4. A painting booth being capable of reutilizing by withdrawing a sprayed paint in the painting booth which sprays a paint to a product surface to be painted and coating the product surface with the paint, the painting booth comprising:

an exhaust duct (41) having an exhaust fan (42) installed in an upper part of the painting booth;

a filter plate (2) configured by a metal net installed on a front wall (1) of the painting booth;

a bottom filter plate (60) installed on a bottom (5) of the painting booth;

a collector (35) collecting paint sludge which falls on the bottom;

a circulation pump (46) pumping the paint sludge from the collector (35); and a paint tank (40) sent to reutilize the paint by the circulation pump (46), wherein an exhaust filter (44) is installed in the exhaust duct (41), a filter (70) is installed between the bottom (5) and the collector (35), and a second filter (50) is installed between the circulation pump (46) and the paint tank (40).

\* \* \* \* \*